US008299137B2

(12) United States Patent
Loh et al.

(10) Patent No.: US 8,299,137 B2
(45) Date of Patent: Oct. 30, 2012

(54) COMPOSITIONS AND USE OF CIS-1,1,1,4,4,4-HEXAFLUORO-2-BUTENE FOAM-FORMING COMPOSITION IN THE PREPARATION OF POLYISOCYANATE-BASED FORMS

(75) Inventors: Gary Loh, Newark, DE (US); Joseph Anthony Creazzo, Wilmington, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 22 days.

(21) Appl. No.: 12/743,255

(22) PCT Filed: Nov. 25, 2008

(86) PCT No.: PCT/US2008/084727
§ 371 (c)(1),
(2), (4) Date: May 17, 2010

(87) PCT Pub. No.: WO2009/073487
PCT Pub. Date: Jun. 11, 2009

(65) Prior Publication Data
US 2010/0280141 A1    Nov. 4, 2010

Related U.S. Application Data

(60) Provisional application No. 60/990,929, filed on Nov. 29, 2007.

(51) Int. Cl.
*C08J 9/14* (2006.01)

(52) U.S. Cl. .............. 521/131; 252/182.24; 252/182.27; 521/164; 521/167; 521/170; 521/174

(58) Field of Classification Search .............. 521/131, 521/164, 167, 170, 174; 252/182.24, 182.27
See application file for complete search history.

(56) References Cited

U.S. PATENT DOCUMENTS

| 3,085,918 A | 4/1963 | Sherliker et al. |
| 3,723,318 A | 3/1973 | Butler |
| 3,884,828 A | 5/1975 | Butler |
| 4,085,073 A | 4/1978 | Suh et al. |
| 4,394,491 A | 7/1983 | Hoffman |
| 4,613,708 A | 9/1986 | Riess et al. |
| 4,704,410 A | 11/1987 | Booth et al. |
| 4,704,411 A | 11/1987 | Gansow et al. |
| 5,037,572 A | 8/1991 | Merchant |
| 5,164,419 A | 11/1992 | Bartlett et al. |
| 5,204,159 A | 4/1993 | Tan |
| 5,332,761 A | 7/1994 | Paquet et al. |
| 5,463,150 A | 10/1995 | Lui et al. |
| 5,578,137 A | 11/1996 | Shealy |
| 5,631,306 A * | 5/1997 | Dams et al. ............. 521/131 |
| 5,900,185 A | 5/1999 | Tapscott |
| 5,908,822 A | 6/1999 | Dishart |
| 5,977,271 A | 11/1999 | McKay et al. |
| 6,071,580 A | 6/2000 | Bland et al. |
| 6,590,005 B2 | 7/2003 | Singh et al. |
| 6,610,250 B1 | 8/2003 | Tuma |
| 6,703,431 B2 | 3/2004 | Dietzen et al. |
| 6,787,580 B2 | 9/2004 | Chonde et al. |
| 2004/0119047 A1 | 6/2004 | Singh et al. |
| 2004/0256594 A1 | 12/2004 | Singh et al. |
| 2005/0233934 A1 | 10/2005 | Singh et al. |
| 2007/0077488 A1 | 4/2007 | Chen et al. |
| 2007/0096051 A1 | 5/2007 | Napa et al. |
| 2007/0098646 A1 | 5/2007 | Nappa et al. |
| 2007/0100009 A1 | 5/2007 | Creazzo et al. |
| 2007/0100010 A1 | 5/2007 | Creazzo et al. |
| 2007/0100011 A1 | 5/2007 | Creazzo et al. |
| 2007/0102021 A1 | 5/2007 | Nappa et al. |
| 2007/0105738 A1 | 5/2007 | Nappa et al. |
| 2007/0108403 A1 | 5/2007 | Sievert et al. |
| 2007/0203046 A1 | 8/2007 | Minor et al. |
| 2008/0269532 A1 | 10/2008 | Swearingen |

FOREIGN PATENT DOCUMENTS

| DE | 2534315 | 2/1976 |
| EP | 0558763 A1 | 8/1993 |
| EP | 0398147 B1 | 9/1994 |
| EP | 0731162 A1 | 11/1996 |
| EP | 350316 B1 | 2/1997 |
| GB | 950876 | 2/1964 |
| JP | 05179043 | 7/1993 |
| WO | 94/23008 A1 | 10/1994 |
| WO | 2004/037913 A2 | 5/2004 |
| WO | 2005/099718 A1 | 10/2005 |
| WO | 2006/101882 A2 | 9/2006 |
| WO | 2008/057513 A1 | 5/2008 |
| WO | 2008/134061 A2 | 11/2008 |

(Continued)

OTHER PUBLICATIONS

M. Taverna et. al., "Soluble or Insoluble Alternative Blowing Agents? pROCESSING tECHNOLOGIES for Both Alternatives, Presented by Equipment Manufacturer", Published in Polyurethanes World Congress 1991 From the Proceedings of the SPI/SOPA Sep. 24-26, 1991, Acropolis, Nice, France.
Santini G. et. al., "The Reaction of Perfluoroalkylcopper Compounds With 1-Bromo-Perfluoroalkyethylenes", Tetrahedron, vol. 29, 1973, p. 2411-2414, XP002427778, Table 3; Compound 2A, 2B.
Devallezbernard et. al., "Solubility of Respiratory Gases in the 1, 2-Bis(F-Alkyl) Ethenes", Journal De Chimie Physique, Societe De Chimie Physique, Paris, France, vol. 85, No. 10, 1988, p. 947-952, XP008077143.
Gao et al., "Dip-Coating of Ultra Think Liquid Lubricant and Its Control for Thin-Film Magnetic Hard Disks", IEEE Transactions on Magnetics, vol. 31, No. 6, 1995, p. 2982-2984.

(Continued)

*Primary Examiner* — John Cooney

(57) ABSTRACT

A foam-forming composition is disclosed which includes both cis-1,1,1,4,4,4-hexafluoro-2-butene and a poorly compatible active hydrogen-containing compound having two or more active hydrogens. Also disclosed is a closed-cell polyurethane or polyisocyanurate polymer foam prepared from reaction of effective amounts of the foam-forming composition and a suitable polyisocyanate. Also disclosed is a process for producing a closed-cell polyurethane or polyisocyanurate polymer foam by reacting an effective amount of the foam-forming composition with a suitable polyisocyanate.

6 Claims, No Drawings

FOREIGN PATENT DOCUMENTS

| | | |
|---|---|---|
| WO | 2008/154612 A1 | 12/2008 |
| WO | 2009/014965 A1 | 1/2009 |
| WO | 2009/014966 A1 | 1/2009 |
| WO | 2009/032983 A1 | 3/2009 |
| WO | 2009/073487 A1 | 6/2009 |
| WO | 2009/085857 A2 | 7/2009 |

OTHER PUBLICATIONS

Le Blanc M et. al., "A Strategy for the Synthesis of Pure, Inert Perfluoroalkylated Derivatives Designed for Flood Substitution", Oxygen Carrying C9OLLOIDAL Blood Substitues, IInternational Symposium Perfluorochem Blood Substitutes, 1982, p. 43-49, XP008077176.

F. Jeanneaux et al., "Additional Thermique Des IODO-1-Perfluoroalcanes Sur Les Perfluoroalkylethylenes", Journal of Fluorine Chemistry, 4 (1974), p. 261-270.

World Meteorological Organization Global Ozone Research and Monitoring Project, Scientific Assessment of Ozone Depletion: 2002, "Source Gases", Report No. 47, Published Mar. 2003, p. 1.28-1.31.

Skochdopole, R. E. et. al., "Polystyrene Foams", Encyclopedia of Polymer Science, vol. 16 (1989), p. 193-206.

Pedler A. E. et. al., "The Synthesis and Dehydroflurination of Some Polyfluoroalkanes", J. Fluorine Chem., vol. 1 No. 3, 1972, p. 337-345, XP002427764.

M. F. Doherty and M.F. Malone, Conceptual Design of Distillation Systems, McGraw-Hill (New York), 2001, 185-186, 351-359).

"Phase Equilibrium in Process Design", Wiley-Interscience Publisher, 1970, written by Harold R. Null, on pp. 124 to 126.

"The Properties of Gases and Liquids," 4th edition, published by McGraw Hill, written by Reid, Prausnitz and Poling, on pp. 241 to 387, (2001).

"Phase Equilibria in Chemical Engineering," published by Butterworth Publishers, 1985, written by Stanley M. Walas, pp. 165 to 244.

H. Boden et. al., Chapter 4, Polyurethane Handbook, Edited by G. Oertel, Hanser Publishers, NY 1985.

H. Grunbauer et. al., "Fine Celled CFC-Free Rigid Roam—New Machinery With Low Boiling Blowing Agents", Published in Polyurethanes 92 from the Proceeding of the SPI 34th Annual Technical/Marketing Conference, Oct. 21-24, 1992, New Orleans, Louisiana.

* cited by examiner

COMPOSITIONS AND USE OF CIS-1,1,1,4,4,4-HEXAFLUORO-2-BUTENE FOAM-FORMING COMPOSITION IN THE PREPARATION OF POLYISOCYANATE-BASED FORMS

FIELD OF THE INVENTION

The disclosure herein relates to foam-forming compositions comprising a fluoroolefin blowing agent and an active hydrogen-containing compounds, and using such compositions for producing polyurethane and polyisocyanurate foams. More particularly, the disclosure herein relates to foam-forming compositions comprising cis-1,1,1,4,4,4-hexafluoro-2-butene and a poorly compatible active hydrogen-containing compound having two or more active hydrogens, and using such compositions for producing polyurethane and polyisocyanurate foams.

BACKGROUND OF THE INVENTION

Closed-cell polyisocyanate-based foams are widely used for insulation purposes, for example, in building construction and in the manufacture of energy efficient electrical appliances. In the construction industry, polyurethane/polyisocyanurate board stock is used in roofing and siding for its insulation and load-carrying capabilities. Poured and sprayed polyurethane foams are widely used for a variety of applications including insulating roofs, insulating large structures such as storage tanks, insulating appliances such as refrigerators and freezers, insulating refrigerated trucks and railcars, etc.

All of these various types of polyurethane/polyisocyanurate foams require blowing agents for their manufacture. Insulating foams depend on the use of halocarbon blowing agents, not only to foam the polymer, but primarily for their low vapor thermal conductivity, a very important characteristic for insulation value. Historically, polyurethane foams used CFCs (chlorofluorocarbons, for example CFC-11, trichlorofluoromethane) and HCFCs (hydrochlorofluorocarbons, for example HCFC-141b, 1,1-dichloro-1-fluoroethane) as the primary blowing agent. However, due to the implication of chlorine-containing molecules such as the CFCs and HCFCs in the destruction of stratospheric ozone, the production and use of CFCs and HCFCs has been restricted by the Montreal Protocol. More recently, hydrofluorocarbons (HFCs), which do not contribute to the destruction of stratospheric ozone, have been employed as blowing agents for polyurethane foams. An example of an HFC employed in this application is HFC-245fa (1,1,1,3,3-pentafluoropropane). The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future.

Hydrocarbons have also been proposed as foam blowing agents. However, these compounds are flammable, and many are photochemically reactive, and as a result contribute to the production of ground level ozone (i.e., smog). Such compounds are typically referred to as volatile organic compounds (VOCs), and are subject to environmental regulations.

There is need for producing foams that provide low flammability, good thermal insulation and high dimensional stability by using a blowing agent that has substantially no ozone depletion potential (ODP) and no or very low global warming potential (GWP). Cis-1,1,1,4,4,4-hexafluoro-2-butene is one of the good candidates.

Japanese Patent No. 05179043 discloses the use of cis-1,1,1,4,4,4-hexafluoro-2-butene as the blowing agent together with highly compatible polyether polyols to form polyurethane foams.

There is need for producing polyurethane/polyisocyanurate foams by using cis-1,1,1,4,4,4-hexafluoro-2-butene as the blowing agent together with poorly compatible active hydrogen-containing compounds having two or more active hydrogens.

SUMMARY OF THE INVENTION

This disclosure provides a foam-forming composition comprising cis-1,1,1,4,4,4-hexafluoro-2-butene and a poorly compatible active hydrogen-containing compound having two or more active hydrogens.

This disclosure also provides a closed-cell polyurethane or polyisocyanurate polymer foam prepared from reaction of effective amounts of the foam-forming composition and a suitable polyisocyanate.

This disclosure also provides a method for producing a closed-cell polyurethane or polyisocyanurate polymer foam. The method comprises reacting an effective amount of the foam-forming composition and a suitable polyisocyanate.

DETAILED DESCRIPTION

The composition of this disclosure is a foam-forming composition comprising cis-1,1,1,4,4,4-hexafluoro-2-butene and a poorly compatible active hydrogen-containing compound having two or more active hydrogens, in the form of hydroxyl groups. In this disclosure, cis-1,1,1,4,4,4-hexafluoro-2-butene is used as a blowing agent.

Cis-1,1,1,4,4,4-hexafluoro-2-butene is a known compound, and its preparation method has been disclosed, for example, in U.S. Patent Application No. 60/926,293 [FL1346 US PRV] filed Apr.26/2007, hereby incorporated by reference in its entirety.

By "poorly compatible", it is meant to refer to an active hydrogen-containing compound in which the solubility of cis-1,1,1,4,4,4-hexafluoro-2-butene does not exceed 25 wt %.

By "highly compatible", it is meant to refer to an active hydrogen-containing compound in which the solubility of cis-1,1,1,4,4,4-hexafluoro-2-butene is more than 40 wt %.

By "cream time", it is meant to refer to the time period starting from the mixing of the active hydrogen-containing compound with polyisocyanate, and ending at when the foaming starts to occur and color of the mixture starts to change.

By "rise time", it is meant to refer to the time period starting from the mixing of the active hydrogen-containing compound with polyisocyanate, and ending at when the foam rising stops.

By "tack free time", it is meant to refer to the time period starting from the mixing of the active hydrogen-containing compound with polyisocyanate, and ending at when the surface of the foam is no longer tacky.

By "initial R-value", it is meant to refer to the polymer foam's insulation value (thermal resistance) measured at a mean temperature of 75° F. within 24 hours after the foam is formed and becomes tack free.

The active hydrogen-containing compounds of this invention can comprise compounds having two or more groups that contain an active hydrogen atom reactive with an isocyanate group, such as described in U.S. Pat. No. 4,394,491; hereby incorporated by reference. Examples of such compounds have at least two hydroxyl groups per molecule, and more specifically comprise polyols, such as polyether or polyester polyols. Examples of such polyols are those which have an equivalent weight of about 50 to about 700, normally of about 70 to about 300, more typically of about 90 to about 270, and carry at least 2 hydroxyl groups, usually 3 to 8 such groups.

Examples of suitable polyols comprise polyester polyols such as aromatic polyester polyols, e.g., those made by transesterifying polyethylene terephthalate (PET) scrap with a glycol such as diethylene glycol, or made by reacting phthalic anhydride with a glycol. The resulting polyester polyols may be reacted further with ethylene—and/or propylene oxide—to form an extended polyester polyol containing additional internal alkyleneoxy groups.

Examples of suitable polyols also comprise polyether polyols such as polyethylene oxides, polypropylene oxides, mixed polyethylene-propylene oxides with terminal hydroxyl groups, among others. Other suitable polyols can be prepared by reacting ethylene and/or propylene oxide with an initiator having 2 to 16, generally 3 to 8 hydroxyl groups as present, for example, in glycerol, pentaerythritol and carbohydrates such as sorbitol, glucose, sucrose and the like polyhydroxy compounds. Suitable polyether polyols can also include alaphatic or aromatic amine-based polyols.

The present invention also relates to processes for producing a closed-cell polyurethane or polyisocyanurate polymer foam by reacting an effective amount of the foam-forming compositions with a suitable polyisocyanate.

Typically, before reacting with a suitable polyisocyanate, the active hydrogen-containing compound described hereinabove and optionally other additives are mixed with the blowing agent cis-1,1,1,4,4,4-hexafluoro-2-butene to form a foam-forming composition. Such foam-forming composition is typically known in the art as an isocyanate-reactive preblend, or B-side composition. The foam-forming composition of this invention can be prepared in any manner convenient to one skilled in this art, including simply weighing desired quantities of each component and, thereafter, combining them in an appropriate container at appropriate temperatures and pressures.

When preparing polyisocyanate-based foams, the polyisocyanate reactant is normally selected in such proportion relative to that of the active hydrogen-containing compound that the ratio of the equivalents of isocyanate groups to the equivalents of active hydrogen groups, i.e., the foam index, is from about 0.9 to about 10 and in most cases from about 1 to about 4.

While any suitable polyisocyanate can be employed in the instant process, examples of suitable polyisocyanates useful for making polyisocyanate-based foam comprise at least one of aromatic, aliphatic and cycloaliphatic polyisocyanates, among others. Representative members of these compounds comprise diisocyanates such as meta- or paraphenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), napthylene-1,5-diisocyanate, 1-methylphenyl-2,4-phenyldiisocyanate, diphenylmethane-4,4-diisocyanate, diphenylmethane-2,4-diissocyanate, 4,4-biphenylenediisocyanate and 3,3-dimethyoxy-4,4 biphenylenediisocyanate and 3,3-dimethyldiphenylpropane-4,4-diisocyanate; triisocyanates such as toluene-2,4,6-triisocyanate and polyisocyanates such as 4,4-dimethyldiphenylmethane-2,2,5,5-tetraisocyanate and the diverse polymethylenepoly-phenylopolyisocyanates, mixtures thereof, among others.

A crude polyisocyanate may also be used in the practice of this invention, such as the crude toluene diisocyanate obtained by the phosgenating a mixture comprising toluene diamines, or the crude diphenylmethane diisocyanate obtained by the phosgenating crude diphenylmethanediamine. Specific examples of such compounds comprise methylene-bridged polyphenylpolyisocyanates, due to their ability to crosslink the polyurethane.

It is often desirable to employ minor amounts of additives in preparing polyisocyanate-based foams. Among these additives comprise one or more members from the group consisting of catalysts, surfactants, flame retardants, preservatives, colorants, antioxidants, reinforcing agents, filler, antistatic agents, among others well known in this art.

Depending upon the composition, a surfactant can be employed to stabilize the foaming reaction mixture while curing. Such surfactants normally comprise a liquid or solid organosilicone compound. The surfactants are employed in amounts sufficient to stabilize the foaming reaction mixture against collapse and to prevent the formation of large, uneven cells. In one embodiment of this invention, about 0.1% to about 5% by weight of surfactant based on the total weight of all foaming ingredients (i.e. blowing agents+active hydrogen-containing compounds+polyisocyanates+additives) are used. In another embodiment of this invention, about 1.5% to about 3% by weight of surfactant based on the total weight of all foaming ingredients are used.

One or more catalysts for the reaction of the active hydrogen-containing compounds, e.g. polyols, with the polyisocyanate may be also employed. While any suitable urethane catalyst may be employed, specific catalyst comprise tertiary amine compounds and organometallic compounds. Exemplary such catalysts are disclosed, for example, in U.S. Pat. No. 5,164,419, which disclosure is incorporated herein by reference. For example, a catalyst for the trimerization of polyisocyanates, such as an alkali metal alkoxide, alkali metal carboxylate, or quaternary amine compound, may also optionally be employed herein. Such catalysts are used in an amount which measurably increases the rate of reaction of the polyisocyanate. Typical amounts of catalysts are about 0.1% to about 5% by weight based on the total weight of all foaming ingredients.

In the process of the invention for making a polyisocyanate-based foam, the active hydrogen-containing compound (e.g. polyol), polyisocyanate and other components are contacted, thoroughly mixed, and permitted to expand and cure into a cellular polymer. The mixing apparatus is not critical, and various conventional types of mixing head and spray apparatus are used. By conventional apparatus is meant apparatus, equipment, and procedures conventionally employed in the preparation of isocyanate-based foams in which conventional isocyanate-based foam blowing agents, such as fluorotrichloromethane ($CCl_3F$, CFC-11), are employed. Such conventional apparatus are discussed by: H. Boden et al. in chapter 4 of the Polyurethane Handbook, edited by G. Oertel, Hanser Publishers, New York, 1985; a paper by H. Grunbauer et al. titled "Fine Celled CFC-Free Rigid Foam—New Machinery with Low Boiling Blowing Agents" published in Polyurethanes 92 from the Proceedings of the SPI 34th Annual Technical/Marketing Conference, Oct. 21-Oct. 24, 1992, New Orleans, La.; and a paper by M. Taverna et al. titled "Soluble or Insoluble Alternative Blowing Agents? Processing Technologies for Both Alternatives, Presented by the Equipment Manufacturer", published in Polyurethanes World Congress 1991 from the Proceedings of the SPI/ISOPA Sep. 24-26, 1991, Acropolis, Nice, France. These disclosures are hereby incorporated by reference.

In one embodiment of this invention, a preblend of certain raw materials is prepared prior to reacting the polyisocyanate and active hydrogen-containing components. For example, it is often useful to blend the polyol(s), blowing agent, surfactant(s), catalysts(s) and other foaming ingredients, except for polyisocyanates, and then contact this blend with the polyisocyanate. Alternatively, all the foaming ingredients may be introduced individually to the mixing zone where the polyisocyanate and polyol(s) are contacted. It is also possible to pre-react all or a portion of the polyol(s) with the polyisocyanate to form a prepolymer.

The invention composition and processes are applicable to the production of all kinds of expanded polyurethane foams, including, for example, integral skin, RIM and flexible foams, and in particular rigid closed-cell polymer foams useful in spray insulation, as pour-in-place appliance foams, or as rigid insulating board stock and laminates.

The present invention also relates to the closed-cell polyurethane or polyisocyanurate polymer foams prepared from reaction of effective amounts of the foam-forming composition of this disclosure and a suitable polyisocyanate.

EXAMPLES

The present disclosure is further defined in the following Examples. It should be understood that these Examples, while indicating preferred embodiments, are given by way of illustration only. From the above discussion and these Examples, one skilled in the art can ascertain the preferred features, and without departing from the spirit and scope thereof, can make various changes and modifications to adapt it to various uses and conditions.

Polyol A is an aromatic polyester polyol (Stepanpol PS2502-A) purchased from STEPAN Inc. at 22W Frontage Road, Northfield, Ill. 60093. Polyol A has viscosity of 3,000 centerpoise at 25° C. The content of hydroxyl groups in Polyol A is equivalent to 240 mg KOH per gram of Polyol A.

Polyol B is a sucrose/glycerine initiated polyether polyol (Voranol 360) purchased from Dow Chemicals Inc. at Midland, Mich., 49641-1206. Polyol B has viscosity of 3,600 centerpoise at 25° C. The content of hydroxyl groups in Polyol B is equivalent to 360 mg KOH per gram of Polyol B.

Polyol C is a toluene diamine (o-TDA) initiated aromatic polyether polyol (VORANOL 391) purchased from Dow Chemicals Inc. at Midland, Mich., 49641-1206. Polyol C has viscosity of 4740 centerpoise at 25° C. The content of hydroxyl groups in Polyol C is equivalent to 391 mg KOH per gram of Polyol C.

Silicon type surfactant is a mixture of 70% polyalkyleneoxidemethylsiloxane and 30% polyalkylene oxide (Niax Silicone L-5440) purchased from Momentive Performance Materials at 187 Danbury Road, Wilton, Conn. 06897 USA.

Amine catalyst (Polycat 8) is N,N-dimethylcyclohexylamine purchased from Air Products Inc. at 7201 Hamilton Blvd, Allentown Pa. 18195.

Co-catalyst (Curithane 52) is 2-methyl(n-methyl amino b-sodium acetate nonyl phenol) purchased from Air Products Inc. at 7201 Hamilton Blvd, Allentown Pa. 18195.

Polymethylene polyphenyl isocyanate (PAPI 27) is purchased from Dow Chemicals, Inc. at Midland, Mich., 49641-1206.

Initial R-value is measured by a LaserComp FOX 304 Thermal Conductivity Meter at a mean temperature of 75° F. The unit of R-value is $ft^2$-hr-° F./BTU-in.

Example 1

Compatibility Test

The polyol-blowing agent (cis-1,1,1,4,4,4-hexafluoro-2-butene) compatibility test was performed in a 3 OZ aerosol sealed glass vessels manufactured by Aerotech Lab. 50 grams of polyol were loaded into the glass vessel. The glass vessel was then sealed at room temperature under atmospheric pressure. Before adding cis-1,1,1,4,4,4-hexafluoro-2-butene into polyol, the glass vessel containing 50 grams of polyol was kept at 25±2° C. for 15 minutes and was visually confirmed for clear appearance. Cis-1,1,1,4,4,4-hexafluoro-2-butene was then injected to the glass vessel at 2.5 (5 wt % based on weight of polyol) grams increment. After each injection, the vessel was shaken for 15 minutes to insure the complete mixing. The vessel was then kept at 25±2° C. for 15 minutes and visually checked for separation and/or emulsion. The above steps were repeated until stable emulsion or separation was observed, or a total of 30 grams (60 wt % based on weight of polyol) of cis-1,1,1,4,4,4-hexafluoro-2-butene was added.

The test indicated that Polyol B had good compatibility with cis-1,1,1,4,4,4-hexafluoro-2-butene, remaining clear in appearance without any sign of emulsion or separation after a total of 30 grams (60 wt % based on weight of polyol) of cis-1,1,1,4,4,4-hexafluoro-2-butene was injected. Polyol A had poor compatibility with cis-1,1,1,4,4,4-hexafluoro-2-butene, showing a stable emulsion after a total of 12.5 grams (25 wt % based on weight of polyol) of cis-1,1,1,4,4,4-hexafluoro-2-butene was injected. Polyol C also had poor compatibility with cis-1,1,1,4,4,4-hexafluoro-2-butene, showing a phase separation from the blowing agent after a total of 2.5 grams (5 wt % based on weight of polyol) of cis-1,1,1,4,4,4-hexafluoro-2-butene was injected.

Example 2

Polyurethane Foam Made from Highly Compatible Polyether Polyol (Polyol B)

Polyol B, surfactant, catalyst, water and cis-1,1,1,4,4,4-hexafluoro-2-butene were pre-mixed by hand and then mixed with polyisocyanate. The resulting mixture was poured into a 8"×8"×2.5" paper box to form the polyurethane foam. The formulation and properties of the foam are shown in Tables 1 and 2 below.

TABLE 1

| Polyurethane formulation - Polyol B | |
|---|---|
| Component | Parts by weight |
| Polyol B | 100 |
| Silicon type surfactant | 2.0 |
| Amine catalyst | 1.5 |
| Co-catalyst | 0.5 |
| Water | 1.0 |
| Cis-1,1,1,4,4,4-hexafluoro-2-butene blowing agent | 29.4 |
| Polymethylene polyphenyl isocyanate | 123 |

TABLE 2

Polyurethane foam properties - Polyol B

| | |
|---|---|
| Foam Index | 1.22 |
| Cream time(second) | 15 |
| Rise time (seconds) | 220 |
| Tack free time(seconds) | 240 |
| Foam density (pounds-per-cubic-feet) | 2.2 |
| Initial R-value (ft$^2$-hr-° F./BTU-in) | 6.9 |

Example 3

Polyurethane Foam Made from the Foam-Forming Composition Containing Poorly Compatible Polyether Polyol (Polyol C)

Polyurethane foam was made using polyol C in the same way as described in Example 2. The polyurethane formulation and properties are shown in Tables 3 and 4 below. By using a foam-forming composition comprising cis-1,1,1,4,4,4-hexafluoro-2-butene and a poorly compatible polyol (Polyol C), the R-value of the foam was improved from 6.9 of Example 2 to 7.2.

TABLE 3

Polyurethane formulation - Polyol C

| Component | Parts by weight |
|---|---|
| Polyol C | 100 |
| Silicon type surfactant | 2.0 |
| Aminecatalyst | 1.5 |
| Co-catalyst | 0.5 |
| Water | 1.0 |
| Cis-1,1,1,4,4,4-hexafluoro-2-butene blowing agent | 29.4 |
| Polymethylene polyphenyl isocyanate | 132 |

TABLE 4

Polyurethane foam properties - Polyol C

| | |
|---|---|
| Foam Index | 1.22 |
| Cream time(second) | 9 |
| Rise time (seconds) | 105 |
| Tack free time(seconds) | 105 |
| Foam density (pounds-per-cubic-feet) | 2.1 |
| Initial R-value (ft$^2$-hr-° F./BTU-in) | 7.2 |

Example 4

Use of Foam-Forming Composition to Improve Polyurethane Foam Made from a Highly Compatible Polyol B

Poorly compatible polyester (polyol A) and polyether polyols (Polyol C) was added to the formulation containing highly compatible polyol B as described in Example 2. Incorporating the poorly compatible polyol A and C into the foam-forming composition of Example 2 improved R-value from 6.9 of Example 2 to 7.4. The polyurethane formulation and properties are shown in Tables 5 and 6 below.

TABLE 5

Polyurethane formulation using polyol A, B and C

| Component | Parts by weight |
|---|---|
| Polyol A | 25 |
| Polyol B | 55 |
| Polyol C | 20 |
| Silicon type surfactant | 2.0 |
| Aminecatalyst | 1.5 |
| Co-catalyst | 0.5 |
| Water | 1.0 |
| Cis-1,1,1,4,4,4-hexafluoro-2-butene blowing agent | 29.4 |
| Polymethylene polyphenyl isocyanate | 117 |

TABLE 6

Polyurethane foam properties (Polyols A, B and C)

| | |
|---|---|
| Foam Index | 1.22 |
| Cream time(second) | 9 |
| Rise time (seconds) | 90 |
| Tack free time(seconds) | 120 |
| Foam density (pounds-per-cubic-feet) | 2.3 |
| Initial R-value (ft$^2$-hr-° F./BTU-in) | 7.4 |

Example 5

Polyurethane Foam Made Using the Foam-Forming Composition Containing Poorly Compatible Polyols A and C

Polyurethane foam was made in the same way as described in Example 2 using poorly compatible polyether polyol (Polyol C) and poorly compatible polyester polyol (Polyol A). The polyurethane formulation and properties are shown in Tables 7 and 8 below. The foam-forming composition produced polyurethane foam with R-value of 7.8, compared to 6.9 from the foam made using highly compatible polyether polyol (Polyol B)

TABLE 7

Polyisocyanurate formulation - Polyol A and C

| Component | Parts by weight |
|---|---|
| Polyol A | 80 |
| Polyol C | 20 |
| Silicon type surfactant | 2.0 |
| Aminecatalyst | 1.5 |
| Co-catalyst | 0.5 |
| Water | 1.0 |
| Cis-1,1,1,4,4,4-hexafluoro-2-butene blowing agent | 29.4 |
| Polymethylene polyphenyl isocyanate | 99 |

TABLE 8

Polyisocyanurate foam properties - Polyol A and C

| | |
|---|---|
| Foam Index | 1.22 |
| Cream time(second) | 8 |
| Rise time (seconds) | 60 |
| Tack free time(seconds) | 60 |
| Foam density (pounds-per-cubic-feet) | 2.4 |
| Initial R-value (ft$^2$-hr-° F./BTU-in) | 7.8 |

What is claimed is:

1. A foam-forming composition comprising cis-1,1,1,4,4,4-hexafluoro-2-butene and a poorly compatible active hydrogen-containing compound having two or more active hydrogens, wherein said poorly compatible active hydrogen-containing compound having two or more active hydrogens is a polyether polyol and a highly compatible active hydrogen-containing compound having two or more active hydrogens.

2. The foam-forming composition of claim 1 wherein said highly compatible active hydrogen-containing compound is a polyol.

3. The foam-forming composition of claim 2 wherein said highly compatible active hydrogen-containing compound is a polyether polyol.

4. A closed-cell polyurethane or polyisocyanurate polymer foam prepared from reaction of effective amounts of the foam-forming composition of claim 1 and a suitable polyisocyanate.

5. The closed-cell polyurethane or polyisocyanurate polymer foam of claim 4 wherein said polymer foam has an initial R-value greater than 6.5 $ft^2$-hr-° F./BTU-in.

6. A process for producing a closed-cell polyurethane or polyisocyanurate polymer foam comprising: reacting an effective amount of the foam-forming composition of claim 1 and a suitable polyisocyanate.

* * * * *